US012620167B2

(12) United States Patent
Krishnamurthy

(10) Patent No.: US 12,620,167 B2
(45) Date of Patent: May 5, 2026

(54) USING VECTOR GRAPHICS TO CREATE 3D CONTENT

(71) Applicant: Sony Interactive Entertainment Inc., Tokyo (JP)

(72) Inventor: Sudha Krishnamurthy, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 687 days.

(21) Appl. No.: 17/935,568

(22) Filed: Sep. 26, 2022

(65) Prior Publication Data

US 2024/0104829 A1      Mar. 28, 2024

(51) Int. Cl.
*G06T 15/20* (2011.01)
(52) U.S. Cl.
CPC ........ *G06T 15/205* (2013.01); *G06T 2200/04* (2013.01)
(58) Field of Classification Search
None
See application file for complete search history.

(56) References Cited

U.S. PATENT DOCUMENTS

2012/0324341 A1    12/2012  Dejean
2018/0089888 A1     3/2018  Ondruska et al.

2020/0126289  A1 *   4/2020  Ondruska ............... G06T 15/20
2020/0279411  A1     9/2020  Atria et al.
2022/0172424  A1 *   6/2022  Vircíková ............... G06T 15/10
2024/0096017  A1 *   3/2024  Gao ........................ G06T 15/04
2024/0420325  A1 *  12/2024  Gringauz .............. G06T 7/0012

FOREIGN PATENT DOCUMENTS

CN         113379627  A  *  9/2021  ............. G06N 3/045
WO       2021179764  A1     9/2021

OTHER PUBLICATIONS

Shi et al., "RendNet: Unified 2D/3D Recognizer with Latent Space Rendering", DOI: https://doi.org/10.48550/arXiv.2206.10066 (Year: 2022).*
"International Search Report and Written Opinion", dated Feb. 6, 2024, from the counterpart PCT application PCT/US23/72967.

* cited by examiner

*Primary Examiner* — Chan S Park
*Assistant Examiner* — Promotto Tajrian Islam
(74) *Attorney, Agent, or Firm* — Fish & Richardson P.C.

(57) ABSTRACT

Deep learning techniques such as vector graphics are used to create 3D content and assets for metaverse applications. Vector graphics is a scalable format that provides rich 3D content. A vector graphics encoder such as a deep neural network such as a recurrent neural network (RNN) or transformer receives vector graphics and generates an encoded output. The encoded output is decoded by a 3D decoder such as another deep neural network that outputs 2D graphics for comparison with the original image. Loss is computed between the original and the output of the 3D decoder. The loss is back propagated to train the vector graphics encoder to generate 3D content.

18 Claims, 5 Drawing Sheets

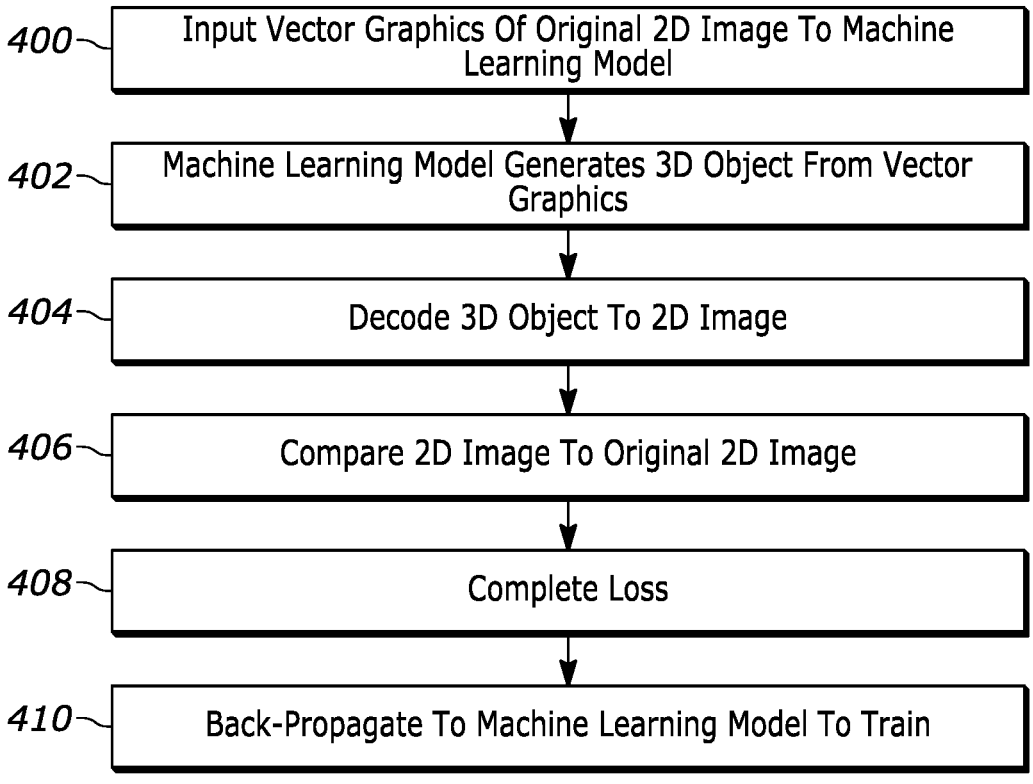

400 ~ Input Vector Graphics Of Original 2D Image To Machine Learning Model

402 ~ Machine Learning Model Generates 3D Object From Vector Graphics

404 ~ Decode 3D Object To 2D Image

406 ~ Compare 2D Image To Original 2D Image

408 ~ Complete Loss

410 ~ Back-Propagate To Machine Learning Model To Train

FIG. 4

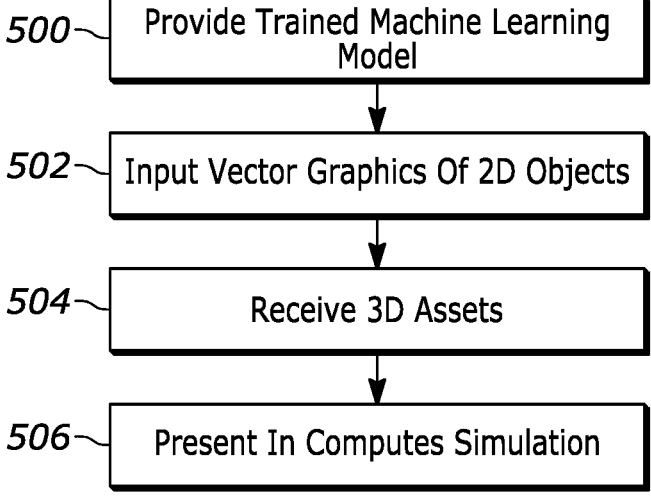

500 ~ Provide Trained Machine Learning Model

502 ~ Input Vector Graphics Of 2D Objects

504 ~ Receive 3D Assets

506 ~ Present In Computes Simulation

FIG. 5

USING VECTOR GRAPHICS TO CREATE 3D CONTENT

FIELD

The present application relates generally to using vector graphics to create 3D content.

BACKGROUND

Graphics for computer simulations such as computer games may include three dimensional (3D) objects mixed with 2D objects, and in particular foreground objects may be rendered in 3D and background objects may be rendered in 2D. 2D objects from, e.g., artists or game developers that are desired to be rendered in 3D in the final product can be created using multiple 2D raster graphics images.

SUMMARY

As understood herein, in rendering 3D graphics, instead of using multiple 2D raster graphics images, vector graphics may be used by a trained machine learning (ML) model to generate 3D assets for computer simulations in a more scalable manner using relatively richer metadata.

In greater detail, conventional 2D to 3D reconstruction methods typically reconstruct 3D from 2D rasterized images. However, as understood herein vector graphics representation of a 2D object provides rich metadata that contains geometric information about the vertices and edges of the object. This can be leveraged along with the pixel information from rasterized images of the object to train machine learning models to volumetrically render a 2D representation into a 3D object. The 3D reconstructed objects can then be embedded into gaming and metaverse environments.

Accordingly, a device includes at least one computer storage that is not a transitory signal and that in turn includes instructions executable by at least one processor to input to at least one machine learning model (ML) model vector graphics representing at least one two dimensional (2D) image. The instructions are executable to receive from the ML model at least one three dimensional (3D) asset responsive to the input, and present, in at least one computer simulation, the 3D asset.

In some embodiments the instructions can be executable to input to the ML model raster graphics representing at least one 2D image and receive from the ML model at least one 3D asset responsive to the input of the raster graphics. The instructions can be executed to present, in the at least one computer simulation, the 3D asset.

The 2D image represented by the raster graphics can be the same 2D image represented by the vector graphics, or it can be a different image.

In another aspect, an apparatus includes at least one computer storage that is not a transitory signal and that in turn includes instructions executable by at least one processor to receive vector graphics representing original two dimensional (2D) images. The instructions are executable to input the vector graphics to at least one machine learning (ML) model, and to receive from the ML model three dimensional (3D) representations of each of the 2D images. The instructions are executable to convert at least some of the 3D representations to converted 2D images, and based at least in part on plural of the converted 2D images and respective original 2D images, generate a loss indication that is provided to the ML model to train the model.

The original 2D images can be considered original first 2D images, the 3D representations can be considered first 3D representations, the converted 2D images can be considered first converted 2D images, the loss indication can be considered a first loss indication, and the instructions may be executable to receive raster graphics representing original second 2D images. In these examples, the instructions may be executable to input the raster graphics to the at least one ML model, receive from the ML model second 3D representations of each of the original second 2D images, and convert at least some of the second 3D representations to second converted 2D images. Based at least in part on plural of the second converted 2D images and respective original second 2D images, a second loss indication can be generated and provided to the ML model to train the model.

In some implementations, the original second 2D images are the same as the original first 2D images. In other implementations, the original second 2D images are not the same as the original first 2D images.

In some implementations, the first loss indication is generated by a first loss function and the second loss indication is generated by a second loss function that is the same as the first loss function. In other implementations, the first and second loss functions are not the same.

In another aspect, a method includes inputting vector graphics representing at least one original two dimensional (2D) image to at least one machine learning (ML) model. The method includes receiving from the ML model at least one 3D asset, using the 3D asset to train the ML model, and/or presenting the 3D asset on at least one display.

The details of the present application, both as to its structure and operation, can be best understood in reference to the accompanying drawings, in which like reference numerals refer to like parts, and in which:

BRIEF DESCRIPTION OF THE DRAWINGS

FIG. 4 illustrates example logic in example flow chart format consistent with FIG. 3;

FIG. 5 illustrates example logic in example flow chart format for using a trained ML model to render 3D asses for computer simulations;

DETAILED DESCRIPTION

Figure 1:
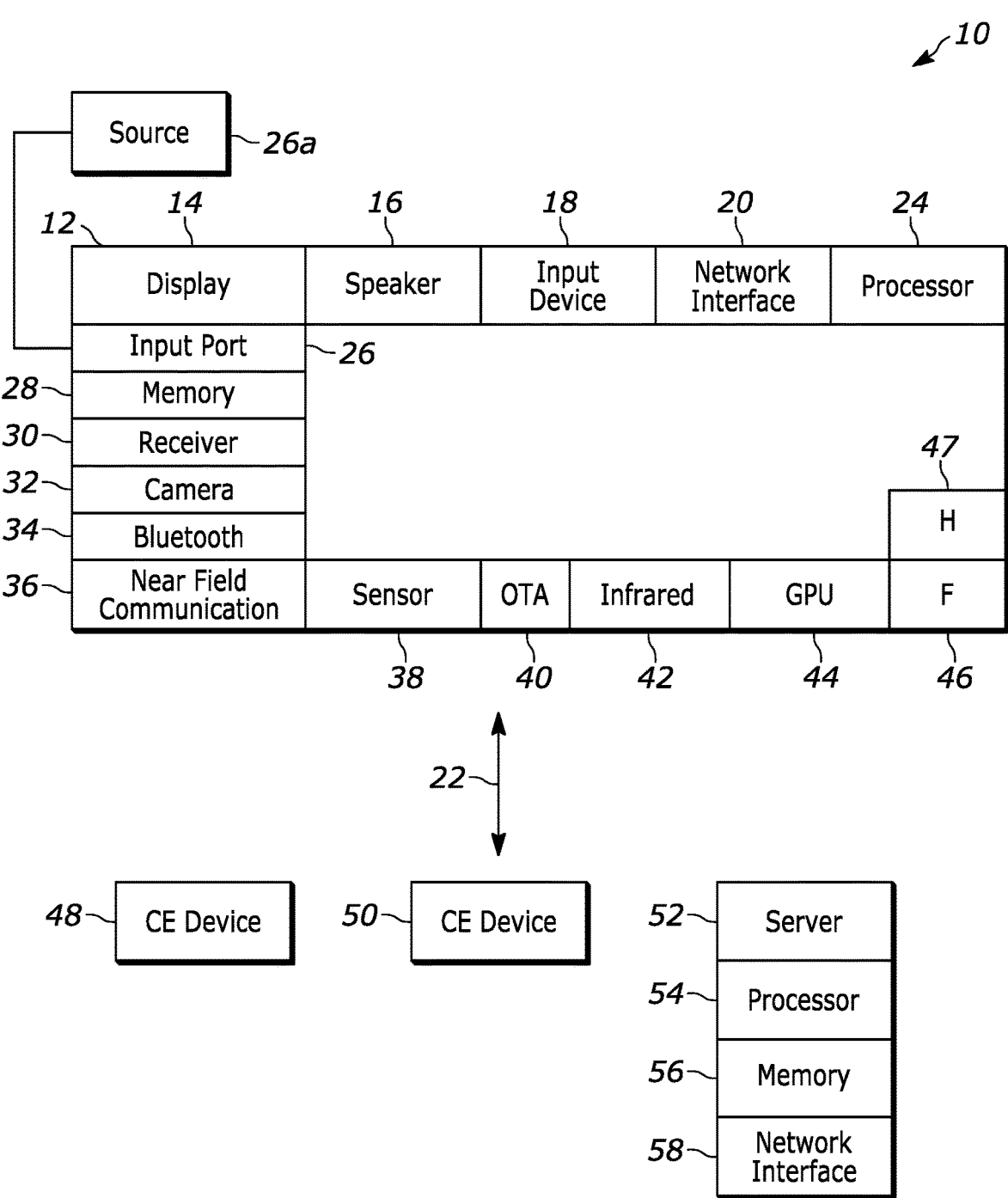
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figures 2, 3:
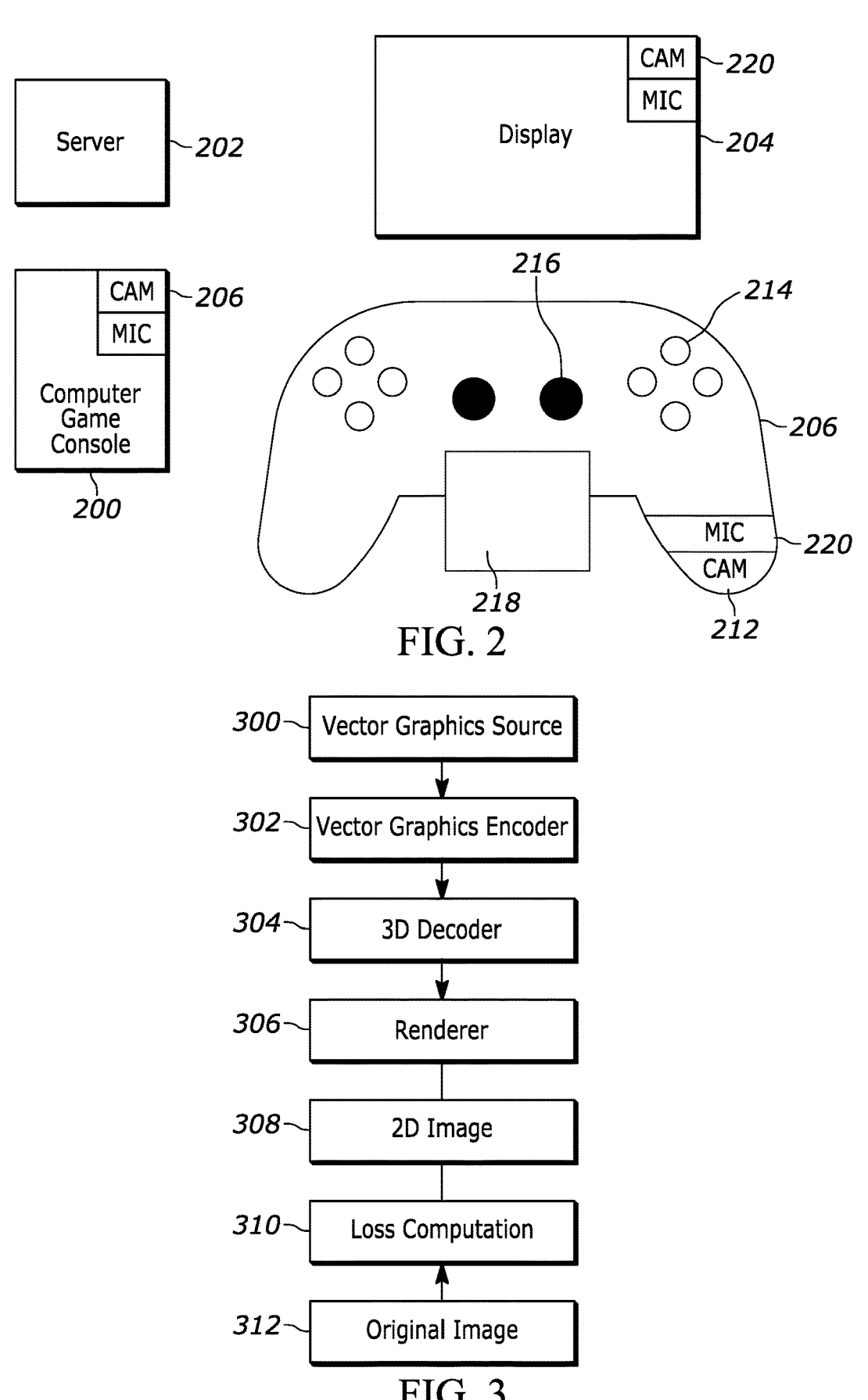
FIG. 2 is a block diagram of a specific computer simulation system such as a computer game system that can be used to present, in computer simulations, 3D assets generated from vector graphics.
FIG. 3 illustrates an example architecture for training a machine learning (ML) model to generate 3D assets generated from vector graphics representing 2D images.

Refer now to FIG. 2. A computer simulation such as a computer game may be sent from a computer game console 200 or a computer game server 202 to a display device 204 such as a TV for presentation of the computer simulation under control of one or more computer simulation controllers 206, such as but not limited to a PlayStation® controller or other controller. The elements of the system incorporate some or all of the appropriate devices and components described above in reference to FIG. 1.

The console 200 may include one or more cameras 208. Similarly, the display 204 may include one or more cameras 210. Yet again, the controller 206 may include one or more cameras 212.

The controller 206 may include one or more control keys 214 and one or more joystick-like control members 216. The controller 206 also may include one or more touchpads 218.

Prior to turning to FIG. 3, as understood herein scalable vector graphics (SVG) is a 2D format in which, unlike raster graphics (which consists of pixels), "vertices" are defined with a sequence of numerical arguments (curves, lines, etc. with coordinates) to define the contours of geometric objects. SVG typically is an extensible markup language (XML)-based vectorized image format for 2D graphics that can be interactively transformed, that consists of a sequence of vectorized curves in basic shapes including rectangles, circles, ellipses, etc. and that can define paths that are simple or compound shape outlines that are drawn with curved or straight lines and that can be filled in with color and outlined with strokes. In conventional 3D rendering, 3D assets are represented as mesh with vertices and faces, making is difficult to determine outlines of the shapes, whereas SVG provides precise data representing object curves.

Turn now to FIG. 3 for an understanding of training a model to generate 3D assets from vector graphics representing 2D images. A source 300 of vector graphics describing 2D images provides vector graphics to vector graphics encoder 302. The vector graphics encoder 302 can be implemented by a machine learning (ML) model that may include one or more neural networks such as recurrent neural networks (RNN) or transformer that generates 3D assets based on the received vector graphics representing 2D images.

Figure 7:
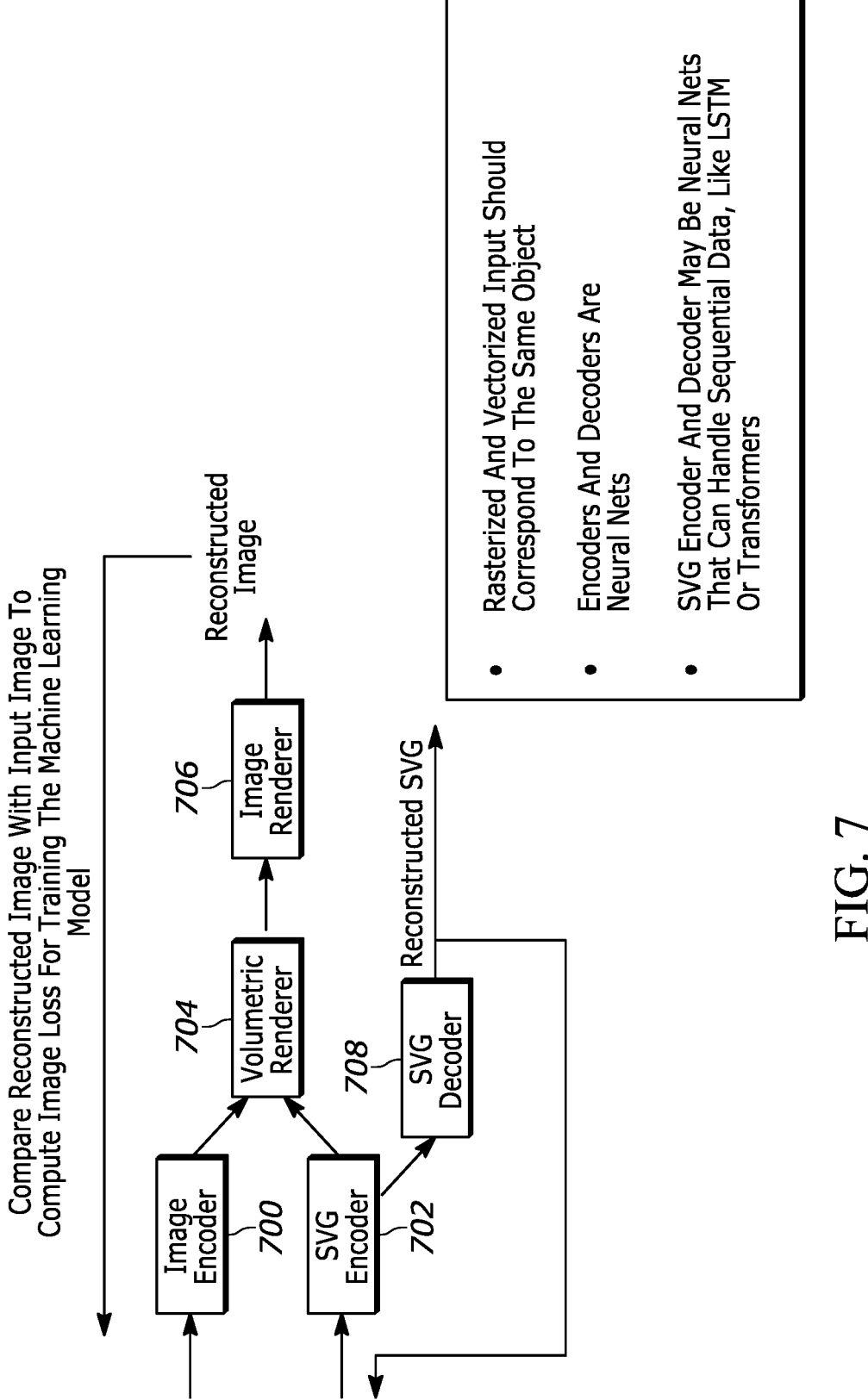
FIG. 7 illustrates an architecture for 3D reconstruction from 2D inputs.

The vector graphics encoder 302 learns a neural representation from the SVG input 300. To generate a 3D volume from the encoding, additional input may be needed, such as rasterized images or depth maps. The output of the encoder 302 is sent to a 3D decoder 304 uses these inputs to generate a 3D volume, which can then be rendered into a 2D image. FIG. 7 below illustrates further. The 3D decoder 304 may be implemented by a deep neural decoder, and its output is sent to a renderer 306 to produce 2D images 308. A loss computation module 310 receives, for every 2D image 308, the original image 312 from whence the vector graphics input to the vector graphics encoder 302 were derived or described. The loss computation module 310 generates a loss indication based on a comparison of the original image 31 and paired 2D image 308. Note that there can be one or more types of loss computations. A first, for example, is by reconstructing the SVG input, in which case the comparison is with data in the source 300. A second loss can be an image loss which is reflected in FIG. 3.

FIG. 4 illustrates logic consistent with the above. Commencing at block 400, vector graphics representing respective original 2D images are input to the ML model that establishes the vector graphic encoder 302 of FIG. 3. Moving to block 402, the ML model generates, for each vector graphics 2D representation, a respective 3D asset that is then decoded back to 2D at block 404. The decoded 2D image is compared at block 406 with the original 2D image to compute a loss at block 408 that represents differences between the two 2D images. The loss is back-propagated to the ML model at block 410 to train the model.

FIG. 5 illustrates how the trained ML model from FIGS. 3 and 4 can be used. The trained ML model is provided at block 500. At block 502 vector graphics representing 2D objects in images are input to the ML model, which generates, for each 2D image a corresponding 3D asset at block 504. The 3D asset may be presented as a 3D object in a computer simulation or other output scenario at block 506 on, e.g., the display 204 shown in FIG. 2.

Figure 6:
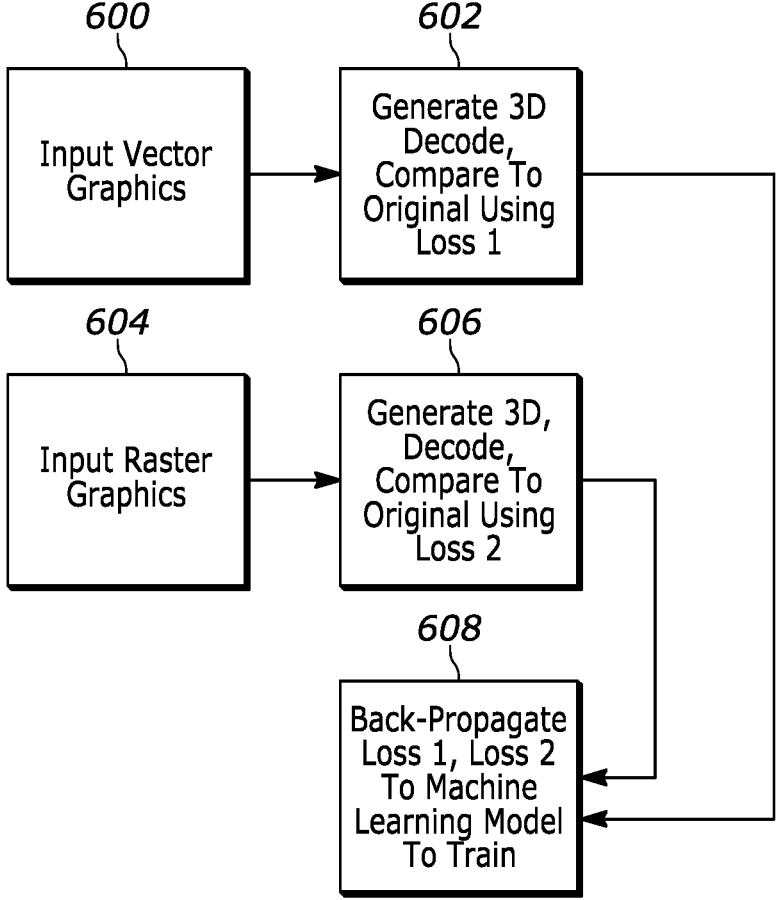
FIG. 6 illustrates example logic in example flow chart format for an alternate training method that uses, in addition to vector graphics, raster graphics.

FIG. 6 illustrates an alternate training technique that uses, in parallel with vector graphics representing 2D images, raster graphics representing 2D images. Blocks 600 and 602 reflect the description of FIGS. 3 and 4 in which vector graphics are input to a ML model at block 602 and the ML model generates corresponding 3D assets at block 602 which are decoded back to 2D and compared to the corresponding original 2D images to generate a first loss indication using a first loss function.

Additionally, block 604 indicates that raster graphics (pixels) representing 2D images can be input to the ML model. The 2D images represented by the raster graphics may be the same 2D images represented by the vector graphics, or they may be different images. In any case, the ML model at block 606 generates, from the raster graphics, corresponding 3D assets that are decoded back to 2D and compared to the corresponding original 2D images associated with the raster graphics input at block 604 to generate a second loss indication using a second loss function. The first and second loss functions may be different from each other if desired, or they may be the same loss function. There may be one or more loss functions to supervise the training, based on the volumetric rendering of the raster graphics and vector graphics input.

Non-limiting example loss functions that can be used include regression loss functions such as mean square error/quadratic loss/L2 loss, mean absolute error/L1 loss, and mean bias error, as well as classification loss functions such as hinge loss/multi class SVM loss and cross entropy loss/negative log likelihood.

FIG. 7 illustrates an architecture in which an image encoder 700 such as any of the encoders described herein receives rasterized images from one or more views. In addition or alternatively, the image encoder 700 can receive a depth map.

A SVG encoder 702 receives a vectorized image (SVG) as input. Output of the encoders 700, 702 is sent to a volumetric renderer 704, which generates a 3D volume from the input 2D representations of the encoders 700, 702 and outputs associated data to a renderer 706, which renders the 3D volume to an image. The image from the renderer 706 is compared to the input image of the image encoder 700 to compute image loss for training the ML model that establishes the image encoder 700.

FIG. 7 also shows that the 2D output of the SVG encoder 702 is sent to a SVG decoder 708, which outputs a reconstructed SVG image. The reconstructed SVG image is compared to the vectorized input of the SVG encoder 702 to compute SVG loss for training the ML model that establishes the SVG encoder 702.

The rasterized and vectorized inputs to the encoders 700, 702, respectively, should correspond to the same object. The encoders and decoders in FIG. 7 may include ML models that include one or more are neural networks. The SVG encoder 702 and SVG decoder 708 may be neural networks that can handle sequential data, such as long short-term (LSTM) networks or transformers. Note that while the SVG encoder/decoder may involve a RNN or transformer or similar networks that handle sequential data, the image encoder-decoder may involve convolution networks, CNN.

While the particular embodiments are herein shown and described in detail, it is to be understood that the subject matter which is encompassed by the present invention is limited only by the claims.

What is claimed is:

1. A method for training a machine learning (ML) model using vector graphics and raster graphics in parallel, the method comprising:

inputting vector graphics representing a first two dimensional (2D) image to the ML model;

receiving from the ML model a first 3D asset;

inputting raster graphics representing a second 2D image to the ML model;

receiving from the ML model a second 3D asset; and using the first 3D asset and the second 3D asset to train the ML model, including:

converting the first 3D asset to a first converted 2D image;

converting the second 3D asset to a second converted 2D image;

comparing the first converted 2D image to the first 2D image to generate a first loss indication;

comparing the second converted 2D image to the second 2D image to generate a second loss indication; and providing the first loss indication and the second loss indication back to the ML model.

2. The method of claim 1, wherein the first 2D image and the second 2D image are the same image.

3. The method of claim 1, wherein the first 2D image and the second 2D image are different images.

4. The method of claim 1, wherein the first loss indication is generated by a first loss function and the second loss indication is generated by a second loss function, the first loss function and the second loss function being the same loss function.

5. The method of claim 1, wherein the first loss indication is generated by a first loss function and the second loss indication is generated by a second loss function, the first loss function and the second loss function being different loss functions.

6. The method of claim 1, wherein the ML model comprises at least one recurrent neural network (RNN).

7. One or more non-transitory computer storage media storing instructions that when executed by one or more computers cause the one or more computers to perform operations for training a machine learning (ML) model using vector graphics and raster graphics in parallel, the operations comprising:

inputting vector graphics representing a first two dimensional (2D) image to the ML model;

receiving from the ML model a first 3D asset;

inputting raster graphics representing a second 2D image to the ML model;

receiving from the ML model a second 3D asset; and using the first 3D asset and the second 3D asset to train the ML model, including:

converting the first 3D asset to a first converted 2D image;

converting the second 3D asset to a second converted 2D image;

comparing the first converted 2D image to the first 2D image to generate a first loss indication;

comparing the second converted 2D image to the second 2D image to generate a second loss indication; and providing the first loss indication and the second loss indication back to the ML model.

8. The one or more non-transitory computer storage media of claim 7, wherein the first 2D image and the second 2D image are the same image.

9. The one or more non-transitory computer storage media of claim 7, wherein the first 2D image and the second 2D image are different images.

10. The one or more non-transitory computer storage media of claim 7, wherein the first loss indication is generated by a first loss function and the second loss indication is generated by a second loss function, the first loss function and the second loss function being the same loss function.

11. The one or more non-transitory computer storage media of claim 7, wherein the first loss indication is generated by a first loss function and the second loss indication is generated by a second loss function, the first loss function and the second loss function being different loss functions.

12. The one or more non-transitory computer storage media of claim 7, wherein the ML model comprises at least one recurrent neural network (RNN).

13. A system comprising:

a processor; and memory coupled to the processor and having stored therein instructions that, when executed by the processor, cause the processor to perform operations for training a machine learning (ML) model using vector graphics and raster graphics in parallel, the operations comprising:

inputting vector graphics representing a first two dimensional (2D) image to the ML model;

receiving from the ML model a first 3D asset;

inputting raster graphics representing a second 2D image to the ML model;

receiving from the ML model a second 3D asset; and using the first 3D asset and the second 3D asset to train the ML model, including:

converting the first 3D asset to a first converted 2D image;

converting the second 3D asset to a second converted 2D image;

comparing the first converted 2D image to the first 2D image to generate a first loss indication;

comparing the second converted 2D image to the second 2D image to generate a second loss indication; and providing the first loss indication and the second loss indication back to the ML model.

14. The system of claim 13, wherein the first 2D image and the second 2D image are the same image.

15. The system of claim 13, wherein the first 2D image and the second 2D image are different images.

16. The system of claim 13, wherein the first loss indication is generated by a first loss function and the second loss indication is generated by a second loss function, the first loss function and the second loss function being the same loss function.

17. The system of claim 13, wherein the first loss indication is generated by a first loss function and the second loss indication is generated by a second loss function, the first loss function and the second loss function being different loss functions.

18. The system of claim 13, wherein the ML model comprises at least one recurrent neural network (RNN).

* * * * *